(12) United States Patent
Lin

(10) Patent No.: US 7,494,701 B2
(45) Date of Patent: *Feb. 24, 2009

(54) REUSABLE AIR PERMEABLE PACKAGING FILM

(76) Inventor: Irene Lin, No. 71, Lane 53, Kuang-Hwa Rd., Shan-Hwa Town, Tainan Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/689,181

(22) Filed: Mar. 21, 2007

(65) Prior Publication Data

US 2007/0160805 A1    Jul. 12, 2007

Related U.S. Application Data

(60) Division of application No. 10/711,194, filed on Aug. 31, 2004, now Pat. No. 7,208,215, which is a continuation-in-part of application No. 09/584,701, filed on Jun. 1, 2000, now abandoned.

(51) Int. Cl.
*B32B 7/12* (2006.01)
*B32B 15/04* (2006.01)
*B32B 3/10* (2006.01)
*B32B 3/00* (2006.01)
*B32B 3/26* (2006.01)

(52) U.S. Cl. .......... 428/136; 428/63; 428/131; 428/137; 428/138; 428/155; 428/172; 428/343; 428/346; 53/440

(58) Field of Classification Search .......... 428/63, 428/131, 137, 138, 155, 172, 343, 346; 53/440
See application file for complete search history.

(56) References Cited

U.S. PATENT DOCUMENTS

| 2,633,284 | A | 3/1953 | Moffett et al. |
| 3,232,442 | A | 2/1966 | Wilson |
| 3,310,505 | A | 3/1967 | Parker |
| 3,378,507 | A | 4/1968 | Sargent et al. |
| 3,387,765 | A | 6/1968 | Davis |
| 3,399,822 | A | 9/1968 | Kugler |
| 3,432,087 | A | 3/1969 | Costello |
| 3,607,793 | A | 9/1971 | Mahlman et al. |
| 3,672,916 | A | 6/1972 | Vimig |
| 3,716,180 | A | 2/1973 | Bemiss et al. |
| 3,812,224 | A | 5/1974 | Smith et al. |

(Continued)

FOREIGN PATENT DOCUMENTS

JP    08-091450    4/1996

(Continued)

*Primary Examiner*—Victor Chang
(74) *Attorney, Agent, or Firm*—Andrus, Sceales, Starke & Sawall, LLP

(57) ABSTRACT

A reusable, air-permeable packaging film formed of a layer of resilient and nontoxic material is disclosed. The packaging film includes a plurality of micro-gaps distributed within a pre-selected area on the packaging film, wherein each of the micro-gaps traverses thickness of the packaging film, and wherein, in a static state, i.e., no pressure/stress exerted on the packaging film, each of the micro-gaps comprises a split upper seam portion with edge ridges demonstrated on a top surface of the packaging film and a close lower seam portion communicating with the split upper seam portion. During microwaving, the pressure can be regulated at a relatively lower vapor transferring rate through the pre-selected area.

7 Claims, 8 Drawing Sheets

U.S. PATENT DOCUMENTS

| | | |
|---|---|---|
| 4,141,487 A | 2/1979 | Faust et al. |
| 4,247,498 A | 1/1981 | Castro |
| 4,350,655 A | 9/1982 | Hoge |
| 4,358,466 A | 11/1982 | Stevenson |
| 4,390,554 A | 6/1983 | Levinson |
| 4,404,241 A | 9/1983 | Mueller et al. |
| 4,419,373 A | 12/1983 | Oppermann |
| 4,466,931 A | 8/1984 | Tanny |
| 4,497,431 A | 2/1985 | Fay |
| 4,530,440 A | 7/1985 | Leong |
| 4,596,713 A | 6/1986 | Burdette |
| 4,657,610 A | 4/1987 | Komatsu et al. |
| 4,689,936 A | 9/1987 | Gaikema et al. |
| 4,769,175 A | 9/1988 | Inoue |
| 4,961,944 A | 10/1990 | Matoba et al. |
| 4,986,673 A | 1/1991 | Bell |
| 5,012,061 A | 4/1991 | Lesser |
| 5,114,766 A | 5/1992 | Jacques |
| 5,141,795 A | 8/1992 | Kai et al. |
| 5,177,332 A | 1/1993 | Fong |
| 5,254,354 A | 10/1993 | Stewart |
| 5,257,475 A | 11/1993 | Tanimura |
| 5,362,500 A | 11/1994 | Mazurek et al. |
| 5,458,951 A | 10/1995 | Kagawa |
| 5,587,192 A | 12/1996 | Beizermann |
| 5,672,406 A | 9/1997 | Challis et al. |
| 5,811,027 A | 9/1998 | Speer et al. |
| 5,834,093 A | 11/1998 | Challis et al. |
| 5,865,926 A | 2/1999 | Wu et al. |
| 5,928,553 A | 7/1999 | Toshima et al. |
| 5,928,582 A | 7/1999 | Kenigsberg |
| 5,989,608 A | 11/1999 | Mizuno |
| 6,068,898 A | 5/2000 | Oyama |
| 6,231,236 B1 | 5/2001 | Tilman |
| 6,607,764 B1 | 8/2003 | Keller |
| 6,637,939 B2 | 10/2003 | Huffer |
| 7,077,923 B2 | 7/2006 | Lin |
| 7,208,215 B2 | 4/2007 | Lin |
| 2001/0012530 A1 | 8/2001 | Hiyoshi |
| 2004/0069157 A1 | 4/2004 | Lin |
| 2006/0076069 A1 | 4/2006 | Haamer |

FOREIGN PATENT DOCUMENTS

| | | |
|---|---|---|
| JP | 10-147381 | 6/1998 |
| JP | 10-278975 | 10/1998 |
| JP | 11-079260 | 3/1999 |
| JP | 11079260 | 3/1999 |
| JP | 11-115950 A | 4/1999 |
| JP | 11-178713 A | 7/1999 |
| JP | 11-189278 | 7/1999 |
| JP | 11301747 A | 11/1999 |
| JP | 2000-025849 | 1/2000 |
| JP | 2000-072156 | 3/2000 |
| JP | 2000085856 A | 3/2000 |
| JP | 2000-190912 | 7/2000 |
| JP | 2000-191055 | 7/2000 |
| JP | 2000-247375 | 9/2000 |
| JP | 2001-31148 | 2/2001 |
| JP | 2001-180764 A | 7/2001 |
| JP | 2001-287774 A | 10/2001 |
| JP | 2002-029574 A | 1/2002 |

REUSABLE AIR PERMEABLE PACKAGING FILM

CROSS REFERENCE TO RELATED APPLICATIONS

This application is a divisional application of U.S. patent application Ser. No. 10/711,194 filed on Aug. 31, 2004, now U.S. Pat. No. 7,208,215, which issued on Apr. 24, 2007, which is a continuation-in-part of U.S. patent application Ser. No. 09/584,701 filed on Jun. 1, 2000 now abandoned.

This is a continuation-in-part of U.S. patent application Ser. No. 09/584,701, filed Jun. 1, 2000 entitled "METHOD FOR MANUFACTURING AN AIR PERMEABLE COMPOSITE FILM".

BACKGROUND OF THE INVENTION

1. Field of the Invention

The present invention relates to the field of air permeable material films. More particularly, the present invention relates to a reusable air permeable packaging film with improved air and moisture vapor permeability, which is particularly suited for microwave heating.

2. Description of the Prior Art

A wide variety of air and moisture vapor permeable materials have been developed for different purposes. For example, these materials can be used in filtration and separation. In U.S. Pat. No. 5,928,582, for example, there is disclosed a method of forming a microporous membrane that uses a process of ultraviolet irradiation to form microsphereulites, followed by a thermally-induced phase separation, yielding microporous membranes that have improved flow and mechanical properties. In U.S. Pat. No. 5,865,926, Wu et al. disclose a method of making a cloth-like microporous laminate of a non-woven fibrous web and thermoplastic film having air and moisture vapor permeability with liquid-barrier properties.

Other manufacturing processes for production of relevant microporous films are known in U.S. Pat. Nos. 3,378,507; 3,310,505; 3,607,793; 3,812,224; 4,247,498 and 4,466,931. For example, in U.S. Pat. No. 4,350,655, Hoge teaches a process for manufacturing a highly porous thermoplastic film formed by cold drawing a film of a synthetic thermoplastic orientative polymer, such as high-density polyethylene, and mixed with coated inorganic filler. The highly porous thermoplastic film is produced by first casting a film of a blend of the polymer-coated inorganic filler mixture, cooling the film to a temperature of 70° C. and cold stretching the film mono-axially or bi-axially to develop the desired void volume and surface ruptures per unit area, thereby obtaining a resin content (by weight) per cubic centimeter of final product of about 0.18 to about 0.32 gm/cc.

The coated inert inorganic filler and the molten polymer are blended together to form a homogeneous mixture through a suitable mixing extruder. The molten mixture is extruded through a die with an opening from 0.006 inches to 0.010 inches in size. The blend is cold stretched mono-axially or bi-axially, preferably in a station provided with a set of grooved rollers. The groove pattern of the rolls is generally of a sinosoidal wave pattern, wherein the film is stretched in a manner to affect uniform stretching between contact points of the material to produce a material of larger dimension in the stretching direction.

Disadvantageously, however, the manufacturing processes of microporous film products according to the prior art methods are too complicated and too expensive to be generally accepted. Furthermore, many operating factors, such as processing temperature, stretching ratios, film thickness, starting materials etc., affect the microporous size of the final products, and thus result in variations of the quality of the microporous film products. In addition, tile filler added to the microporous film products according to the prior art methods is a source of environmental pollution. Furthermore, most of the film products according to the prior art methods are opaque due to the multiple phases of the film products that result from the addition of fillers.

When food has, heretofore, been cooked at home, the food has been wrapped in a wrapping film for home use, or was packed and sealed in an air or moisture impermeable bag. This is heated in a microwave oven. Moisture contained in the food evaporates, and the bag is thus burst due to build up internal pressure. Moreover, when the film products according to the prior art methods are used to form a food-packaging bag, some of the fillers may contaminate the food within the bag, which results in unpleasant odors. Another disadvantage of the prior art film products is poor resistance to alcohol and oil.

The above-mentioned film materials either applied to wrapping film or applied to packaging bag cannot stand microwave heating in a close pack. The prior art material films rupture easily due to the lack of material strength against the build up pressure inside the bag during the microwave heating. Upon rupture of the film, the build up pressure inside the bag suddenly drops off and moisture escapes immediately thus causing dry, hard and bad taste of foodstuff. The purposes of the prior art films are for one time use only. It is desired to provide a reusable air permeable material film suited for microwave heating. Foodstuffs contained by a packing bag formed of such material film can be well treated with much better moisture preservation, food organoleptic quality and delicacies thereof.

Another prior art composite film as disclosed, by way of example, in U.S. Pat. No. 4,689,936 includes a single venting hole that is formed by removing part of the film. Ordinarily, a so-called die cutting process is performed to remove pre-selected area of the film in order to form the through hole in the composite film. Such prior art method causes weight loss of the film. Further, to prevent situations such as rupture of the film or separation of the film from a food tray during microwave heating, the dimension of the venting hole must be large enough. In this case, a hot melt is necessary to seal the through hole.

SUMMARY OF THE INVENTION

It is therefore a primary objective of this invention to provide a reusable air permeable material film and manufacturing method thereof to improve the prior art.

Another objective of the present invention is to provide a novel air permeable packaging film with superior oil and alcohol resistance, and sufficient strength against stress.

According to the claimed invention, a reusable composite film suited for microwave treatment is disclosed. The composite film includes a layer of resilient and nontoxic material; a sealing layer coated onto one side of the composite layer; and a plurality of micro-gaps distributed within a pre-selected area on the composite film. Each of the micro-gaps traverses thickness of the composite film. In a static state, i.e., no pressure/stress exerted on the composite film, each of the micro-gaps comprises a split upper seam portion with edge ridges demonstrated on a top surface of the composite film and a close lower seam portion communicating with the split upper seam portion. The composite film has a bottom surface.

When steam pressure is exerted on the bottom surface in thickness direction, the initially close lower seam portion become split, and the split upper seam portion expands to facilitate pressure regulation.

It is a salient feature that the split upper seam portion and the lower seam portion form a craze that tapers off from the top surface to the bottom surface of the packaging film when pressure is exerted on the bottom surface in thickness direction, such that the pressure is regulated through the craze at a relatively lower vapor transferring rate.

From one aspect of this invention, a reusable air-permeable packaging film formed of a layer of resilient and nontoxic material is disclosed. The packaging film includes a plurality of micro-gaps distributed within a pre-selected area (self-venting area) on the packaging film, wherein each of the micro-gaps traverses thickness of the packaging film, and wherein, in a static state, i.e., no pressure/stress exerted on the packaging film, each of the micro-gaps comprises a split upper seam portion with edge ridges demonstrated on a top surface of the packaging film and a close lower seam portion communicating with the split upper seam portion.

The resilient and nontoxic material is selected from the group consisting of acrylic resins, polyester, polyethylene (PE), polypropylene (PP), copolymer of PE and PP, ethylene-styrene copolymer (ES), cyclo olefin, polyethylene terephthalate (PET), ethylenevinyl alcohol (EVOH), polyvinyl alcohol (PVA), ethylene-vinyl acetate (EVA), ethylene/methacrylic acid (E/MAA) ionomer, Nylon, polyethylene naphthalate (PEN), poly ether ether ketone (PEEK), polycarbonate (PC), polysulfone, polyimide (PI), polyacrylonitrile (PAN), styrene acrylonitrile (SAN), polyurethane (PU), and any combinations thereof.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1A:
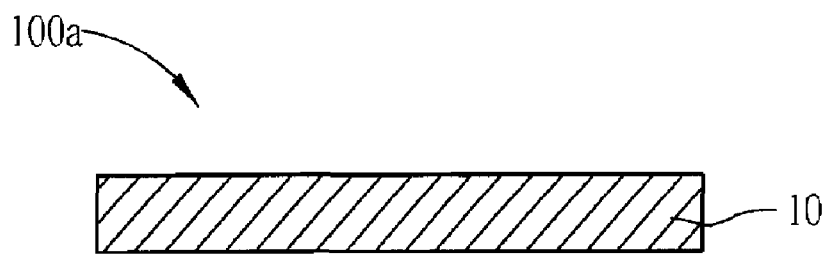
FIG. 1A to FIG. 1C are cross-sectional diagrams of the structure of an air permeable composite film before performing an impression process according to the present invention.
Figure 1B:
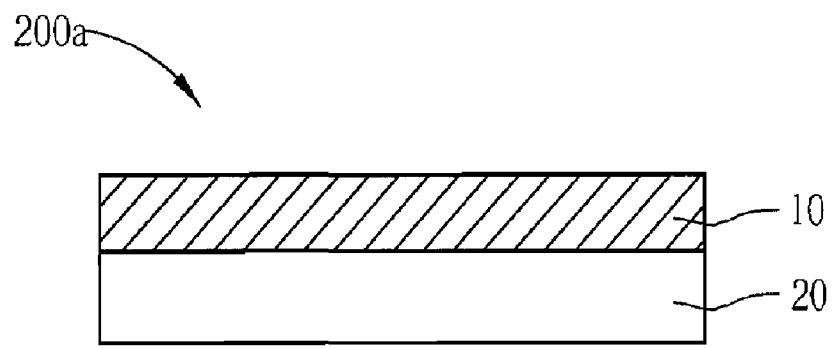
Figure 1C:
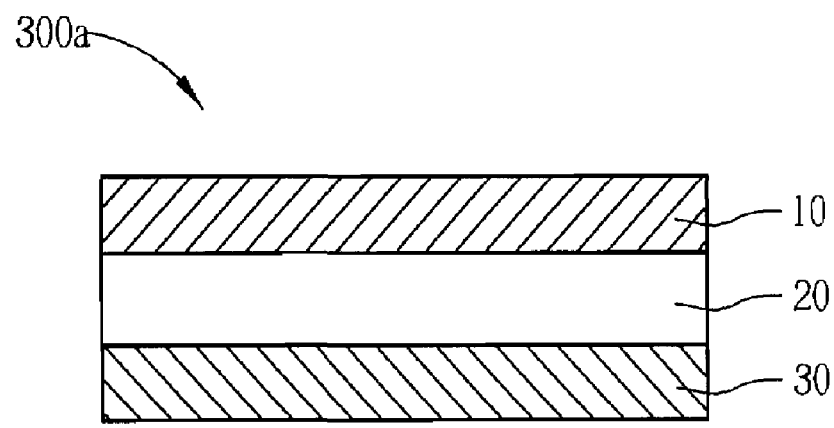

Please refer to FIG. 1A to FIG. 1C. FIG. 1A to FIG. 1C are cross-sectional diagrams of exemplary air permeable material films before performing an impression process according to the present invention. As shown in FIG. 1A, a structure 100a, in this embodiment a polymer composite layer is provided. The structure 100a is made of a resilient and nontoxic material selected from a group comprising acrylic resins, polyester, polyethylene (PE), polypropylene (PP), copolymer of PE and PP, ethylene-styrene copolymer (ES), cyclo olefin, polyethylene terephthalate (PET), Nylon, ethylenevinyl alcohol (EVOH), polyvinyl alcohol (PVA), ethylene-vinyl acetate (EVA), Surlyn™ (Dupont ionomer), polyethylene naphthalate (PEN), poly ether ether ketone (PEEK), polycarbonate (PC), polysulfone, polyimide (PI), polyacrylonitrile (PAN), styrene acrylonitrile (SAN), or polyurethane (PU).

As shown in FIG. 1B, a structure 200a is a bi-layer laminate including a first layer 10 and a second layer 20. The first layer 10 is made of a material selected from a group comprising acrylic resins, polyester, polyethylene (PE), polypropylene (PP), copolymer of PE and PP, ethylene-styrene copolymer (ES), cyclo olefin, polyethylene terephthalate (PET), Nylon, ethylenevinyl alcohol (EVOH), polyvinyl alcohol (PVA), ethylene-vinyl acetate (EVA), Surlyn™ (Dupont ionomer), polyethylene naphthalate (PEN), poly ether ether ketone (PEEK), polycarbonate (PC), polysulfone, polyimide (PI), polyacrylonitrile (PAN), styrene acrylonitrile (SAN), or polyurethane (PU).

The second layer 20 is made of a material selected from a group comprising acrylic resins, polyester, polyethylene (PE), polypropylene (PP), ethylene-styrene copolymer (ES), cyclo olefin, polyethylene terephthalate (PET), Nylon, ethylenevinyl alcohol (EVOH), polyvinyl alcohol (PVA), ethylene-vinyl acetate (EVA), Surlyn™ (Dupont ionomer), polyethylene naplithalate (PEN), poly ether ether ketone (PEEK), polycarbonate (PC), polysulfone, polyimide (PI), polyacrylonitrile (PAN), styrene acrylonitrile (SAN), or polyurethane (PU), synthetic papers, glassine papers, polyolefin coated paper or paper-like materials. For commercial purposes, the first layer 10 and the second layer 20 are preferably made of transparent materials, but not limited thereto.

As shown in FIG. 1C, film structure 300a is a sandwiched laminate comprising a first layer 10, a second layer 20 stacked on the first layer 10, and a third layer 30 stacked on the second layer 20. Preferably, the first layer 10 is made of a material with a relatively lower melting point selected from a group comprising acrylic resins, polyester, polyethylene (PE), polypropylene (PP), copolymer of PE and PP, ethylene-styrene copolymer (ES), cyclo olefin, polyethylene terephthalate (PET), Nylon, ethylenevinyl alcohol (EVOH), polyvinyl alcohol (PVA), ethylene-vinyl acetate (EVA), Surlyn™ (Dupont ionomer), polyethylene naphthalate (PEN), poly ether ether ketone (PEEK), polycarbonate (PC), polysulfone, polyimide (PI), polyacryloritrile (PAN), styrene acryloritrile (SAN), or polyurethane (PU).

The second layer 20 and the third layer 30 are made of materials selected from a group comprising acrylic resins, polyester, polyethylene (PE), polypropylene (PP), ethylene-styrene copolymer (ES), cyclo olefin, polyethylene terephthalate (PET), Nylon, ethylenevinyl alcohol (EVOH), polyvinyl alcohol (PVA), ethylene-vinyl acetate (EVA), Surlyn™ (Dupont ionomer), polyethylene naphthalate (PEN), poly ether ether ketone (PEEK), polycarbonate (PC), polysulfone, polyimide (PI), polyacrylonitrile (PAN), styrene acrylonitrile (SAN), or polyurethane (PU), synthetic papers, glassine papers, or paper-like materials.

Figure 2A:
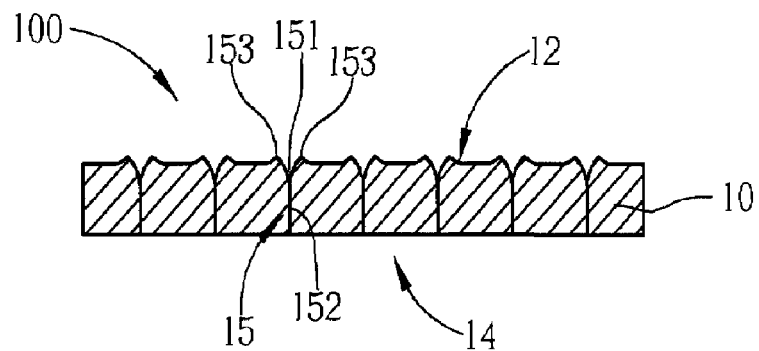
FIG. 2A to FIG. 2C are cross-sectional diagrams of the structure of an air permeable composite film after performing an impression process according to the present invention.
Figure 2B:
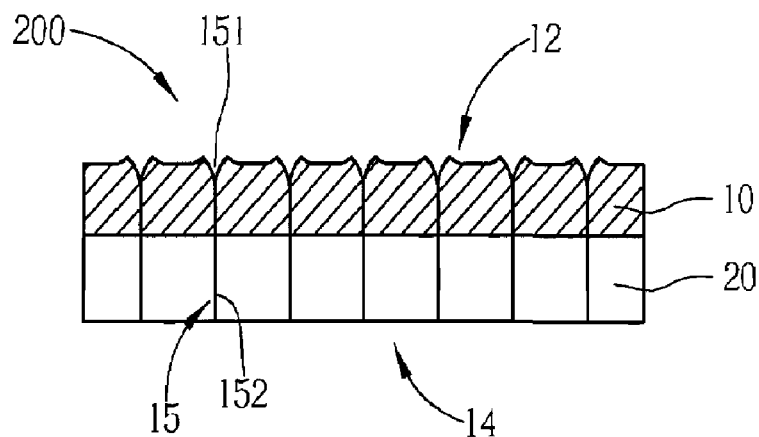
Figure 2C:
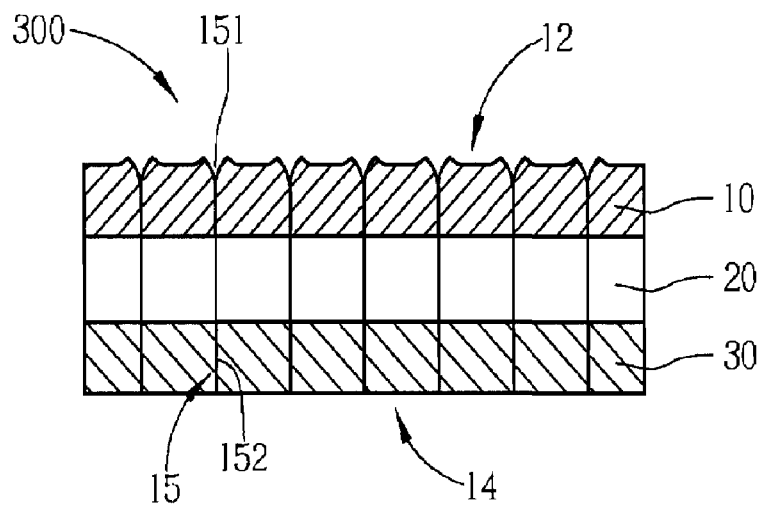

Please refer to FIG. 2A to FIG. 2C. FIG. 2A to FIG. 2C are cross-sectional diagrams of air permeable structures 100, 200, and 300 after performing an impression process according to the present invention. These figures are in respective combination with FIGS. 1A to FIG. 1C. The structures 100a, 200a, and 300a in FIG. 1A to FIG. 1C may be partially impressed by using a salient impression process in a direction (thickness direction) from the top face 12 to the bottom face 14. By doing this, micro-gaps 15, preferably line gaps, are formed in structures 100, 200, and 300. As shown in FIG. 2A to FIG. 2C, each of the micro-gaps 15 traverses the thickness of the structure 100, 200 or 300.

According to this invention, the micro-gap 15 comprises a split upper seam portion 151 with adjacent slightly protruding edge ridges 153 demonstrated on the top surface 12 of the film structure 100, 200 or 300, and a close lower seam portion 152 communicating with the split upper seam portion 151. As specifically indicated, two edges at the lower portion 152 of the micro-gap are physically in contact with each other to form a closed micro-gap 15 when a pressure difference between the two sides of the film structure is approximately zero (i.e., in a static state). At this phase, when no stress is exerted on the structure, the film is substantially not air permeable. Meanwhile, the micro-gaps 15 are approximately closed (pseudo-closed) and the surfaces of the structure 100, 200 or 300 have a pseudo-planar topography.

Figure 3:
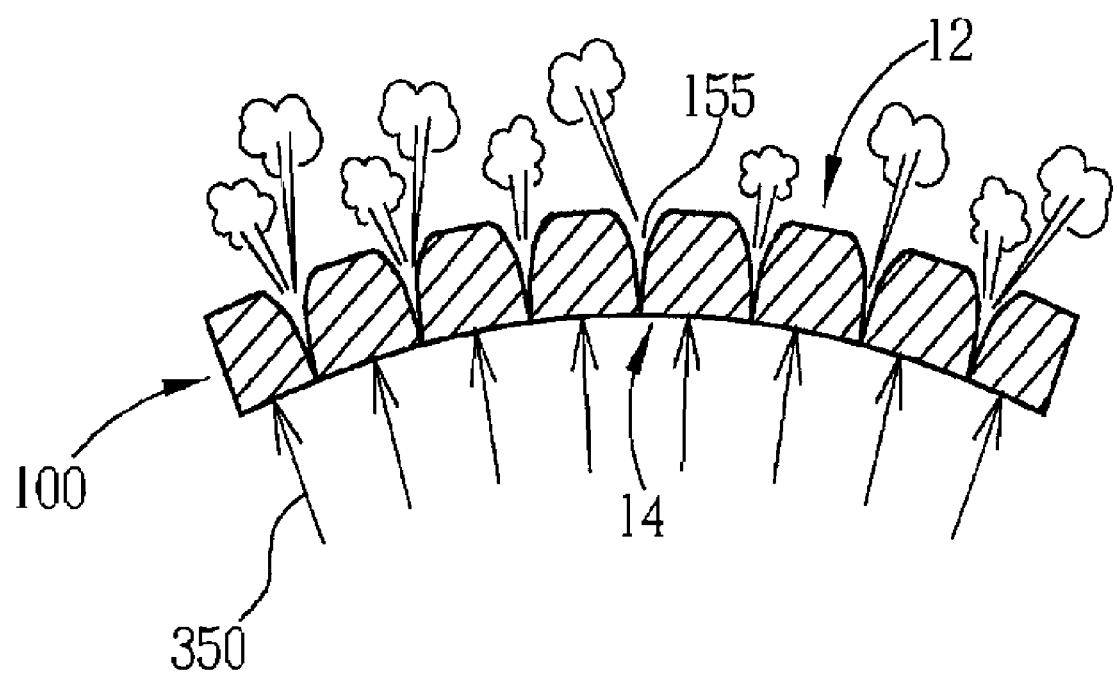
FIG. 3 is a schematic, cross-sectional diagram demonstrating the case when a pressure difference is exerted on the structure of FIG. 2A.

Referring to FIG. 3 and considering the structure 100 of FIG. 2A as an example for the sake of simplicity, when the structure 100 swells due to pressure difference between the two sides of the film, the micro-gaps 15 expand along the film surface direction. The micro-gaps 15 enlarge and become air permeable, and retentively restore back to its original static state when the external pressure difference is removed. As specifically indicated in FIG. 3, when a large pressure 350 is exerted onto the bottom surface 14 in thickness direction, the initially close lower seam portion 152 of the micro-gap 15 becomes split, and the split upper seam portion 151 expands to facilitate pressure regulation.

It is the characteristic feature of the present invention that the upper seam portion 151 and the lower seam portion 152 form a craze 155 that tapers off from the top surface 12 to the bottom surface 14 of the film structure 100 when the initially close lower seam portion 152 of the micro-gap 15 starts to split because of internal pressure build up. It is important that the tapered craze 155 regulates the internal pressure at a relatively lower vapor transferring rate. That is, most of moisture will not escape immediately when the craze forms. When applying such structure 100 to a microwave packaging bag for foodstuffs, the packaging bag is capable of sustaining a high steam pressure (>1 atm) during microwave heating without rupturing the bag. Since the bag can retain moisture of the food contained by the bag for a longer period of time during microwave heating, therefore scrumptious organoleptic quality, delicate, and fast, well-treated microwave food can be provided.

It is worthy noted that after executing the impression process, unlike the die cutting process, there is no weight loss on the film structures. That is, no part of the structure 100, 200 or 300 is removed. The micro-gaps 15 are formed by a characteristic impression method. The impressed area can be selected as desired to form a partial impressed area, or the whole area on the structure can be impressed. Both continuous-type impression cylinder roller sets and batch-type planar table-like impression machines are suitable for the impression process. The former, however, is more economical, and is more easily automated. The continuous-type impression cylinder assembly comprises an impression cylinder and one opposing cylinder. Both the cylinder roller set and planar table-like machine include an impresser and a transfer co-impresser. At least one of the two impressers comprises a plurality of fine protruding grains on the surface of the cylinder or plate (not shown).

The protruding grains may be formed using the following methods: (1) electroplating polyhedron diamond-like powders onto the surface of the impresser; (2) using a laser to engrave ceramic materials or metals formed on the surface of the impresser, such as anilox rolls; (3) using a mechanical tooling method and performing a surface hardening treatment, such as an annealing process, on the metal formed on the surface of the impresser, or plating a hard coating material on the surface of the impresser following a thermal treatment; (4) electrochemically etching and then performing a surface hardening treatment on the surface metal of the impresser. In addition, the opposing cylinder or plate, i.e. the co-impresser, should be made of a metal with a relatively high hardness, such as steel, or ceramic.

Figure 4:
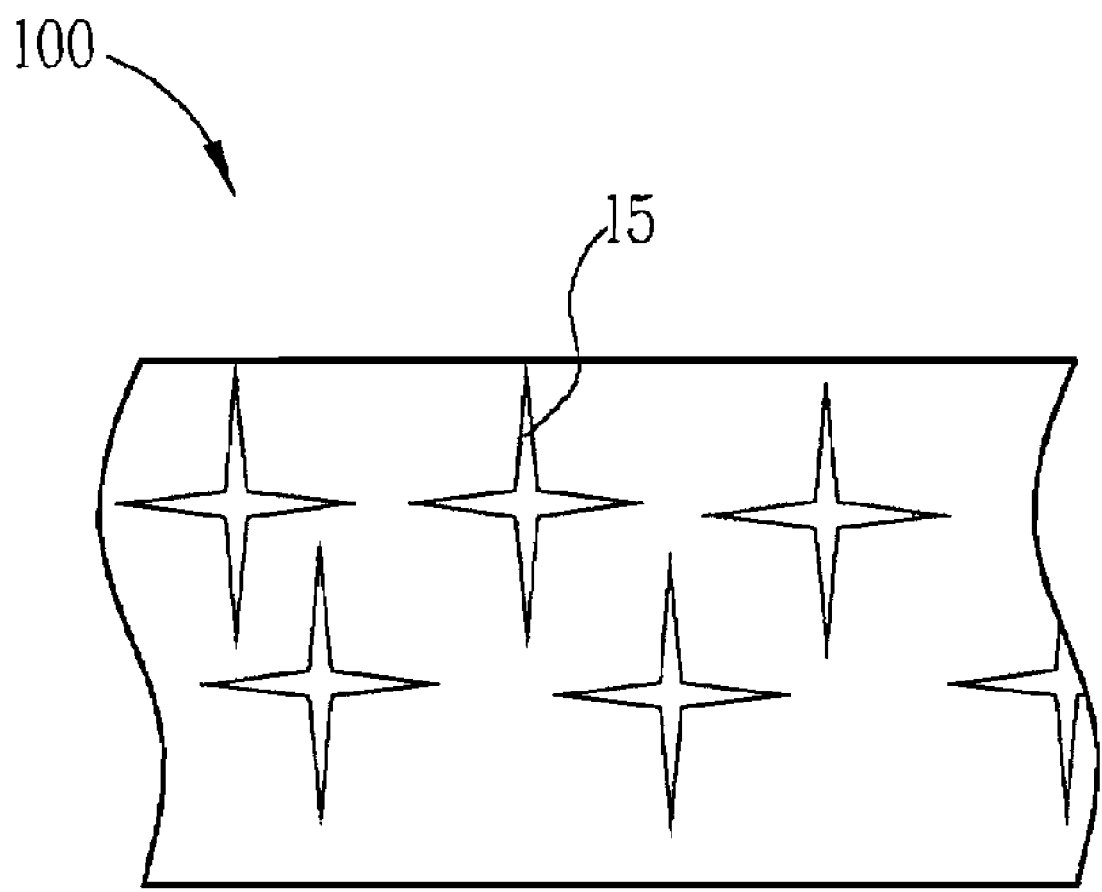
FIG. 4 is a top view of micro-gaps on the surface of an air permeable composite film according to the present invention.

FIG. 4 depicts a top view of cruciform shaped micro-gaps 15 on the top surface 12 of film structure 100 according to one preferred embodiment of the present invention. It is noted that the micro-gaps 15 may have other shapes. Preferably, the shape of the micro-gaps 15 may be selected from linear shapes, conic shapes, pyramidal shapes, tetrahedral shapes, polygonal shapes, and cruciform shapes. Basically, the shape of the micro-gaps 15 depends on the shape of the protruding grains on the surface of the cylinder or plate of the above-described salient impression tools. The micro-gaps 15 can be evenly distributed, locally distributed, regularly distributed, or irregularly distributed within the selected areas on the surface of the air permeable material film structure, depending on the condition of the cylinders, sealing materials and the function of the air permeable film structure.

Figure 5:
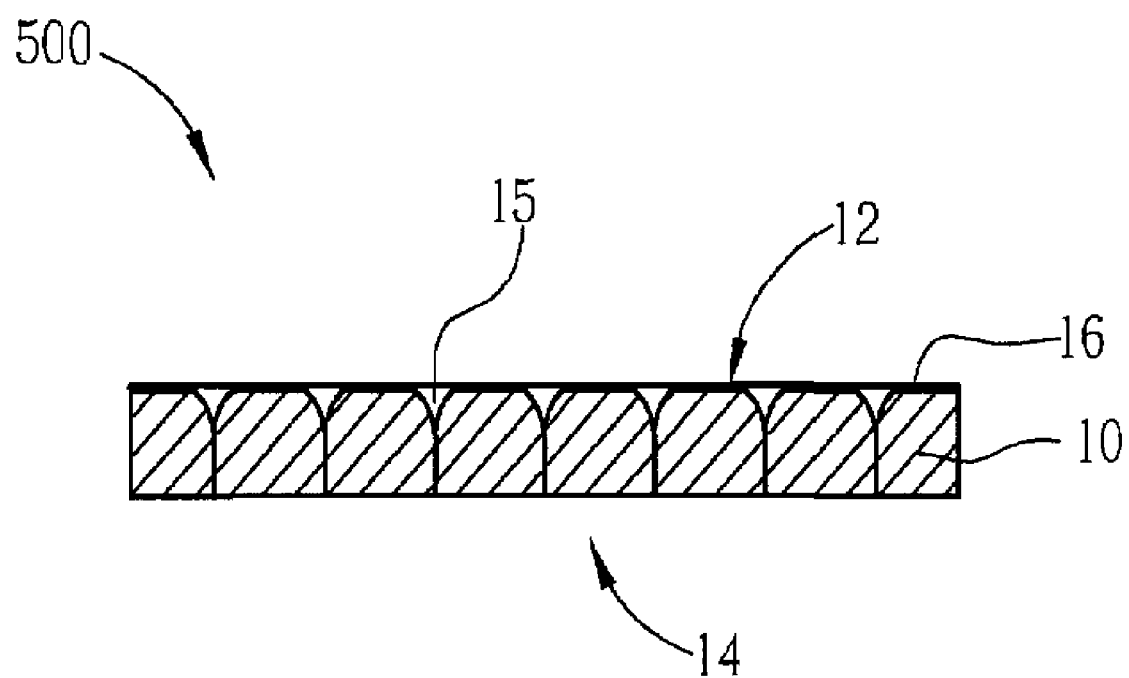
FIG. 5 is a cross-sectional diagram of the structure of an air permeable composite film having a sealing layer disposed on the top face of the air permeable composite film according to the present invention.

Please refer to FIG. 5. FIG. 5 is a cross-sectional diagram of the structure 500 with a sealing layer 16 on the top face 12 of the polymer layer 10 according to another preferred embodiment of the present invention. The sealing layer 16 can be optionally coated onto the top face 12 of the polymer layer 10. Similarly, the sealing layer 16 can also be coated onto the polymer layer 10 of FIG. 2B and FIG. 2C. The sealing layer 16 provides the structure 500 with waterproofing abilities, and better thermal insulating properties. The sealing layer 16 keeps the micro-gaps 15 sealed and air impermeable, and provides the structure 500 with water repelling abilities when the differential pressure between the top face 12 and bottom face 14 is approximately zero. When the differential pressure between the top face 12 and bottom face 14 becomes larger, for example an excess pressure build up during the microwave heating, the micro-gaps 15 become air and vapor permeable. The sealing layer 16 is formed of any suitable sealing materials. The sealing material may be prepared in an emulsion solution type, dispersion solution type or a micronized powder type. Different coating processes can be utilized, such as gravure coater, coma coater, slot coater, sprayer, dipping. It is noted that the thickness of the sealing layer 16 in FIG. 5 not drawn to scale.

Preferably, the sealing layer 16 is made of a material selected from a group comprising lipids, oleaginous materials, wetting agents, surfactants, fatty acids and their derivatives, starch, or amyloid materials and their derivatives, palm waxes, paraffin waxes, micro-crystalline waxes, beeswax, rice bran waxes, synthetic polyethylene (PE) waxes, synthetic polypropylene (PP) waxes, synthetic polyethylene oxide (PEO) waxes and polyolefin. When the composite film structure 500 comes into contact with hot air, the heat of the hot air will degrade the sealing ability of the sealing layer 16, opening the pseudo-closed tiny micro-gaps 15, and the hot air can easily permeate through the sealed micro-gaps 15 of the polymer composite layer when the air pressure exerted by the hot air on the first side of the composite film is greater than the air pressure on the other side of the composite film structure 500. On the other hand, when the heating source is removed, the temperature of the composite film structure 500 decreases and the sealing layer 16 regains its sealing abilities. The sealing layer 16 used to fill the micro-gaps 15 can be formed either before or after the above-described impression process.

The method of the present invention further comprises a thermal process that is used to melt the sealing layer 16 so as to improve the sealing of the micro-gaps 15. If the structure 500 is used for food packaging, the sealing layer 16 is preferably an esculent wax certified by the FDA, which is imperceptible during the use of the structure 500, and should not influence the luster, printablility, or sealing of the film structure. The melting point of the sealing layer 16 is preferably between 40° C. to 110° C. In the preferred embodiment, Paraffin is used due to its superior water repelling characteristics, and because of its vapor permeability. Moreover, oxygen scavengers, or oxidizable metal components, such as iron, aluminum, zinc, nickel, copper, manganese, sodium bisulfate, sulfamic acid, ferrous sulfate, zinc sulfate, etc., can be blended into the sealing layer 16 and/or polymer layer 10 to prevent oxidation and putrefaction of food packed using the film structure 500.

Figure 6:
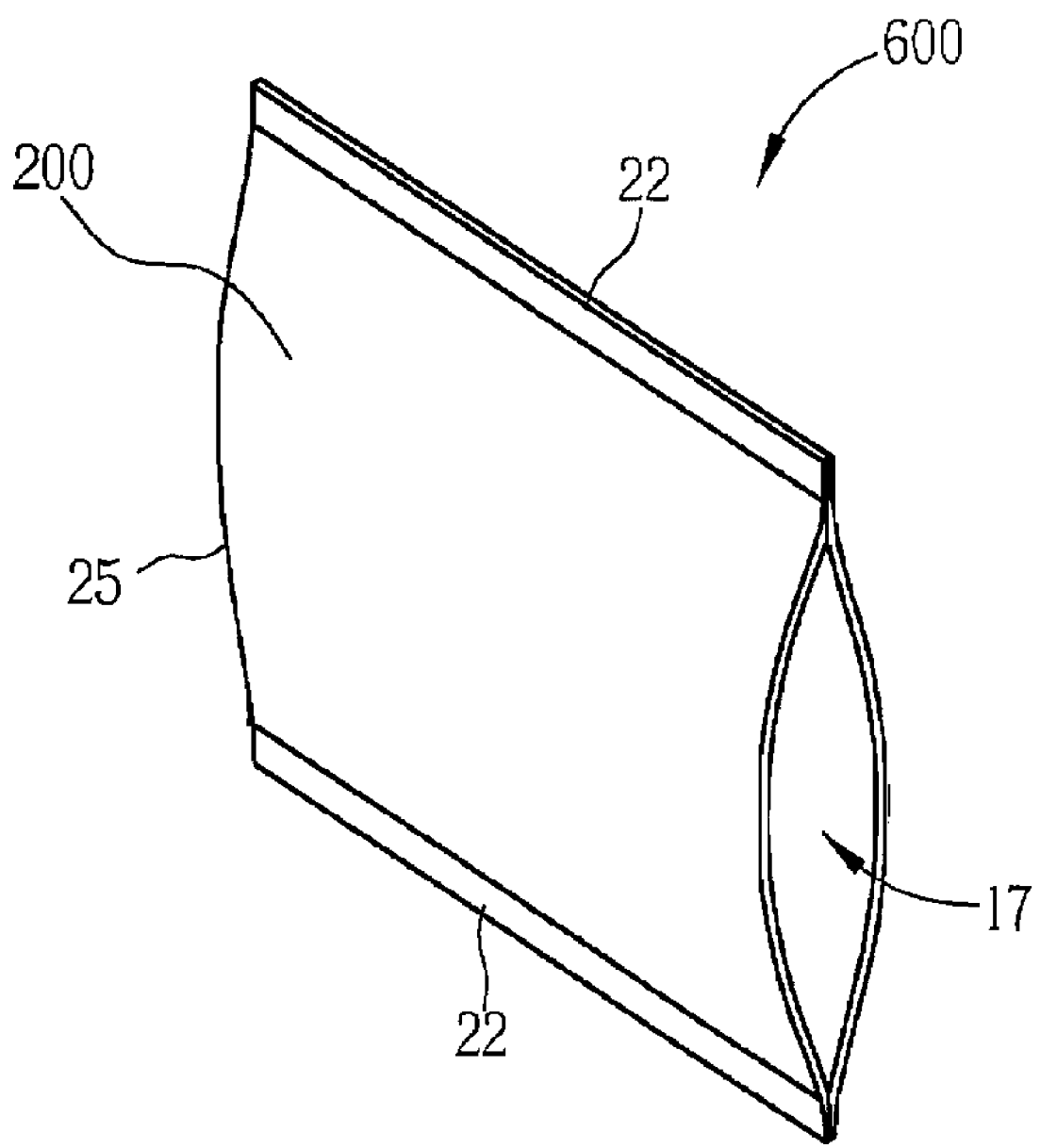
FIG. 6 is a schematic diagram of an air permeable self-venting packaging bag made from an air permeable composite film according to the present invention.

FIG. 6 is a schematic diagram of an air permeable self-venting packaging bag 600 made of the structures in FIG. 2A to FIG. 2C according to the present invention. It is noted that the air permeable packaging bag 600 of the present invention can be made from any of the structures shown in FIG. 2A to FIG. 2C. To form the packaging bag 600, an air permeable film structure, for example, film structure 200 is first provided. A sealing material (not explicitly shown), as earlier mentioned, is coated onto the top surface of the film structure to improve the thermal insulation properties of the air permeable packaging bag 600. But, as mentioned supra, such a sealing material coating is not essential in this invention. The film structure 200 is folded along the middle line 25 to superimpose the folded structure upon itself. The two overlapping edges 22 are then thermally sealed so as to form an open end 17. In use, during microwaving, the open end 17 is sealed, for example, by conventional thermal sealing methods.

In forming the packaging bag 600 of this invention, the use of transparent polymer materials is preferred. The printing upon the surface of the packaging bag 600 can be designed to allow a see-through picture of the food that is contained within the packaging bag 600. Thus, consumers can be assured that the product purchased is exactly what they want, and has been processed in a suitable manner. The reusable air permeable composite film can directly contact food without producing unpleasant taste after microwaving.

Figure 7:
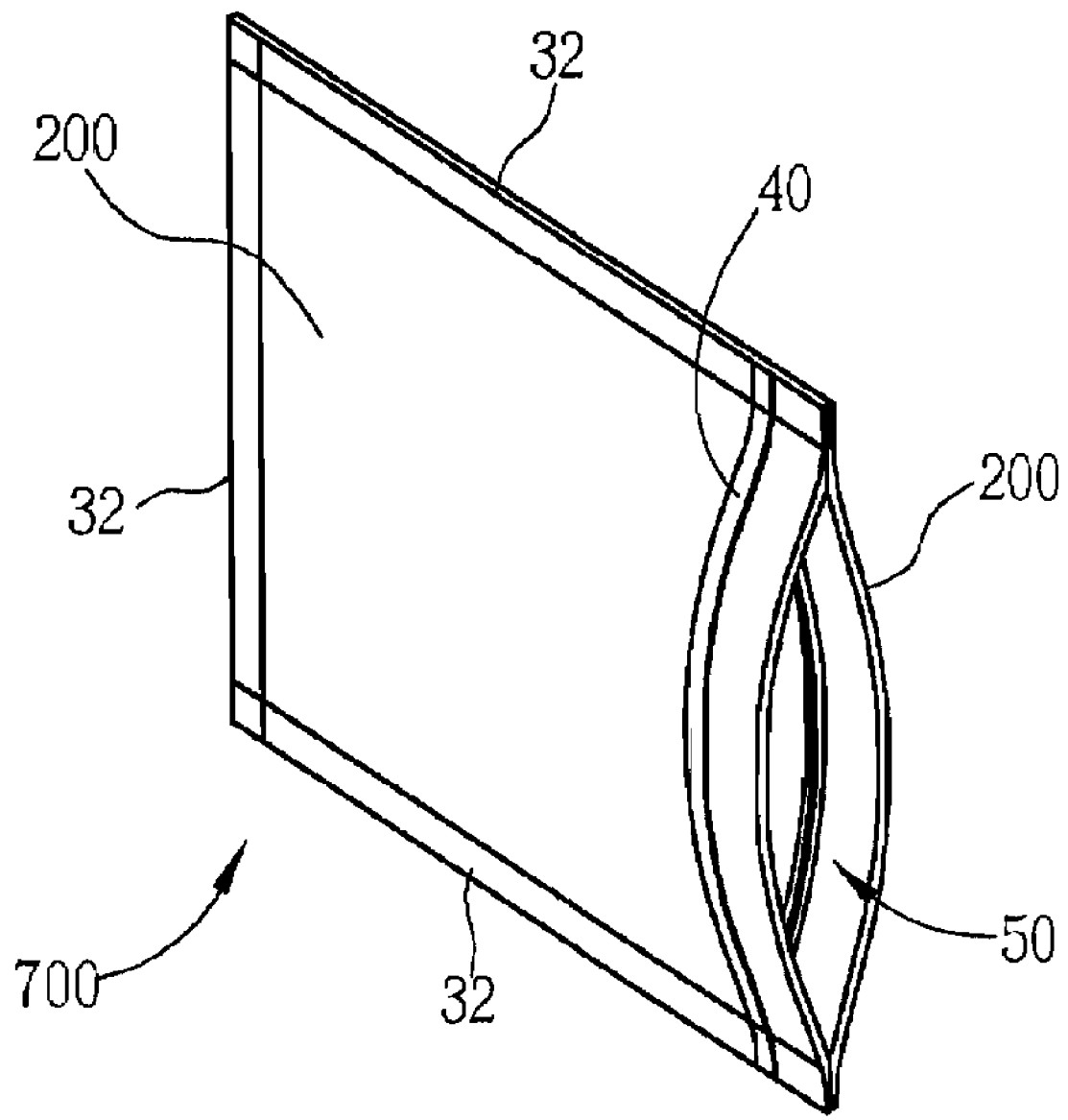
FIG. 7 is a schematic diagram of another embodiment of an air permeable self-venting reclosable packaging bag made of an air permeable composite film according to the present invention.

FIG. 7 is a schematic diagram of another embodiment of an air permeable packaging bag 700 made of the air permeable material film in accordance with the present invention. As shown in FIG. 7, the air permeable packaging bag 700 is formed by folding a film structure superimposing a two film pieces 200 with the same size, and then sealing three of the overlapping edges 32 to leave an open end 50. The three overlapping edges 32 can be sealed using a zipper, an adhesive tape, an ultrasonic pressing process or a thermal pressing process.

After foodstuffs are placed inside the self-venting reclosable packaging bag 700, the open end 50 may be sealed using a zipper, sliding zipper, an adhesive, an ultrasonic pressing process or a thermal pressing process to form a sealed bag. In this embodiment, a zipper 40 consisting of a groove and a corresponding rib mounted on each film piece 200 is used to form an interlocking mechanism that can be conveniently re-opened and re-sealed by the consumers. The zipper 40 is easily grasped. When the zipper 40 is pulled, the open end 50 of the self-venting reclosable packaging bag 700 can be completely opened, and the contents easily removed from the packaging bag. It is noted that the type of adhesive used in the fabrication of this invention is preferably heat resistive. The manufacturer may wish to use a thermally setting adhesive. Such an adhesive, when initially applied to the packaging bag 700, can maintain adhesion, and will not weaken, fracture or soften, particularly when exposed to the heat generated by a microwave cooking cycle.

The air permeable self-venting reclosable packaging bag 700 of the present invention can be used to package a variety of foodstuffs such as frozen food products, fresh food, popcorn, or other substances. The foods packed within the air permeable packaging bag, and which are to be cooked or defrosted, can be directly heated up by means of microwave ovens, steam, boiled water or infrared irradiation. At the beginning of the microwave heating process, the packed food is under a low-temperature condition, and the vapor pressure inside the sealed packaging bag is low. The micro-gaps on the self-venting area surface of the packaging bag are thus sealed and substantially air impermeable. At this phase, most of the microwave energy is kept in the packaging bag and transferred to a state of heat that provides a uniform heating effect on the food due to rapid circulation of heated steam. As the temperature rises, the vapor pressure inside the sealed packaging bag surges. As the pressure difference between the atmosphere and the inner pressure inside the packaging bag increases, the internal vapor pressure inflates the packaging bag and thus enlarges the micro-gaps. When the temperature reaches the softening point of the sealing material, the sealing layer is melted because of the heat, and the thickness of the sealing layer begins to lessen and/or the micro-gaps may start opening up. That makes the micro-gaps become air and vapor permeable. It is salient that the micro-gaps in the present invention act as a pressure-regulating valve that prevents the breakage or rupture of the packaging bag due to the buildup of hot air and steam during a microwave heating process.

It is advantageous to use the air permeable self-venting packaging bag of the present invention because the final condition of the food can be finely controlled by using different recipes in combination with the number of micro-gaps, shape of the micro-gaps, density of the micro-gaps, distribution of the micro-gaps, film thickness of the packaging bag, starting material of the packaging bag, and the materials used in the sealing layer. In addition, cooked food packed in the sealed packaging bag can be frozen or heated repeatedly without impairing the taste of the food, as the structure of the air permeable self-venting packaging bag can be restored to its original conditions.

When juicy food is cooked by a microwave oven with an air permeable bag, in order to prevent liquid leak from the juice food, a bag designed with a partial self-venting area is preferred. The air-impermeable area of the bag, for example the bottom portion of the bag, will hold the soup like food and keep the heated steam and the excess vapor pressure regulated through the partial area of the self-venting area portion of the bag, preferably on the top portion of the bag, which might be located near the zipper.

During the microwave heating, pressure build up is generated within the sealed air permeable packaging bag. In order to regulate pressure thereby preventing bag rupture, a self-venting area with adequate pressure regulating ability on the air permeable packaging bag is necessary. For the composite film with a thickness of about 80 µm or less than 80 µm ($\leq 80$ µm), the minimum self-venting area with distinctive micro-gaps formed therein is preferably at least 3% of the total film surface area. For the composite film with a thickness ranging between 80 µm and 160 µm, the minimum self-venting area with distinctive micro-gaps formed therein is at least 5% of the total film surface area. The average length of micro-gaps among the self-venting area is also varied dependent upon the thickness of the composite film of the air permeable self-venting packaging bag. For the composite film with a thickness of about 80 µm or less than 80 µm, the micro-gaps have an average length preferably ranges between 0.1 µm and 300 µm. For the composite film with a thickness of about 80 µm to 160 µm, the average length of the micro-gaps ranges between 0.3 µm and 500 µm. However, a composite film having stronger mechanical strength will provide a better resistance to the vapor pressure during the microwave heating. That will provide more secure air permeable packaging bag without burst happening.

One of the salient features of the invention is that the packaging bag can be used for comestible articles that are to be cooked in a microwave oven with a uniform cooking result. The loss of food constituents, such as water, alcohol, fat, flavor, aromatics and other special components is alleviated or avoided. Since the unique micro-gaps regulate the steam pressure at a relatively lower vapor transferring rate, the moisture of the food contained by the sealed bag will not escape immediately. It provides a means for reducing the criticality of the microwave cooking time, as well as reducing the attention and activity associated with conventional microwave cooking. More particularly, the present invention enables the cooking of frozen foods in microwave ovens without having to initially thaw the food, and/or without having to provide power level changes to sequentially effect thawing and cooking. The packaging bag of this invention can be refrigerated or frozen during the storage of the contained product, and functions very effectively under such conditions. Also, the packaging bag of this invention provides a low-cost, self-identifying microwave-cooking container that may also be used for leftovers and home-frozen foods.

In order to ensure a germ-, bacteria- and fungus-free environment when packaging food and medical clinical articles, food or clinical swabs can be sealed in the packaging bag followed by a high-temperature sterilization, sanitizing and/or ultraviolet radiation treatment. During the sterilization process, the bag inflates and the sealing ability of the sealing material decreases. Hot and high-pressure air ventilates through the micro-gaps distributed in the permeable packaging bag surface. After the sterilization process, the temperature of the packaging bag returns to room temperature. The molten sealing material solidifies and re-seals the micro-gaps while the temperature decreases. The sealing abilities of the sealing material return. Additionally, the packaging bag will have the appearance of a vacuum-packed bag due to volume contraction at a lower temperature. Therefore, the storage period of germ-free packaged food or clinical products is extended. Therefore, this process is convenient for cooking fresh meat or raw fishes within the sealed bag. The sealed cooked meat can be frozen and be re-heated with microwave oven for many times. The packaging bag of the present invention is transparent. And as previously explained, the packaging bag is re-usable, and may be used repeatedly for leftovers, for freezing or refrigeration, or for general storage, and subsequent re-heating within a microwave oven.

In addition, the air permeable self-venting structure of the invention can be manufactured to form a variety of bags, such as back-sealed bags, gadget bags, three-sided bags or standing pouches. Notably, soups and stews can be packaged using a standing pouch, which is designed to have a distinctive air permeable structure near the top portion of the standing pouch above the level of the soup or stew. When the pouch is cooked in a microwave oven and the soup begins to boil, the hot, high-pressure air ventilates through the opened micro-gaps or craze distributed at the top of the standing bag, and so the bag does not burst.

In another embodiment according to this invention, the air permeable self-venting structure can also be used in combination with a microwave tray (not shown) for cooking food. The microwave tray is made of heat resistant materials, such as polymeric materials, ceramics, polyolefin-coated paper, wood or bamboo materials, or glasses, can have compartments with different sizes, and is used to hold the food for cooking. The tray has an open rim on its outer peripheral area. The distinctive air permeable self-venting film structure of the invention is used to seal the microwave tray, covering the food held by the tray. The open rim of the microwave tray is snugly sealed using methods mentioned earlier, such as a thermal pressing method or by using a rim secure socket, a zipper, sliding zipper, a heat sealing process, an ultrasonic pressing process or an adhesive. For those cooked food surface with a special feature, such as browning, crisping, or singeing, can be achieved via coating and/or blending a unique heat or temperature enhancer material such as carbon black or metallic oxide coating within microwave tray at a selected area. It is capable of converting more microwave energy to heat within those selected areas causing a higher temperature.

Figure 8:
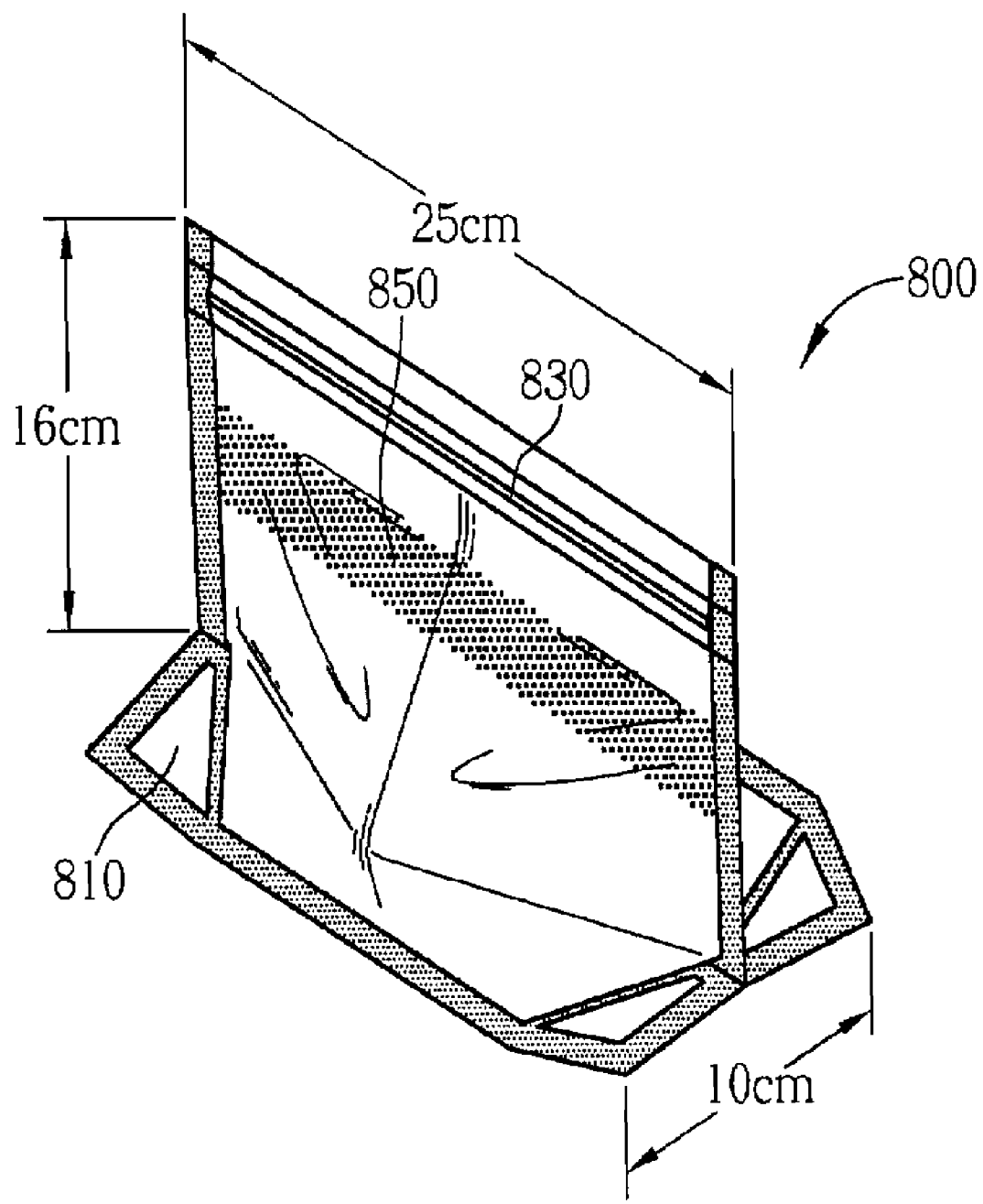
FIG. 8 is a schematic diagram of another embodiment of an air permeable self-venting reclosable packaging stand up pouch made of an air permeable composite film according to the present invention.

Referring to FIG. 8, another preferred embodiment of this invention is demonstrated. The reusable microwave reclosable standup pouch 800 as Illustrated in FIG. 8 is made of a laminated PET/CPP composite film and a polypropylene reclosable zipper profile 830. In re the dimensions, the pouch 800 is 25 cm in width, 16 cm in height, and a 10 cm folding bottom. As specifically indicated, a 25 cm×5 cm self-venting area 850 is provided on the composite film adjacent to the reclosable zipper profile 830. A bursting test is conducted with a mixture of 50 c.c. water and 1 c.c. vegetable oil contained by the standup pouch 800. The reclosable zipper profile 830 is tightly sealed. The standup pouch 800 containing water and oil is then placed inside a microwave oven and microwaved at 700 W for 3 minutes. The oil-mixed water inside the pouch starts to boil at 50 seconds. During the microwave heating process, the pouch inflates like a pillow, but no rupture occurs. Addition of vegetable oil increases the boiling temperature. The pressure build up also results in a higher temperature that facilitates food cooking or defrosting. Accordingly, the present invention air permeable self-venting packaging bag acts as a pressure steamer cooking soft pack. In order to cook liquid like foodstuffs such as soup, a partial self-venting area is preferably located at the top portion of the standup pouch 800. During the microwave heating, there is no splattering and no need to clean kitchen.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A reusable air-permeable packaging film formed of a layer of resilient and nontoxic material, said packaging film comprising a plurality of micro-gaps distributed within a pre-selected area on said packaging film, wherein each of said micro-gaps traverses thickness of said packaging film, and wherein, in a static state in which no pressure or external stress is exerted on said packaging film, each of said micro-gaps comprises a split upper seam portion with edge ridges demonstrated on a top surface of said packaging film and a close lower seam portion communicating with said split upper seam portion.

2. The reusable air-permeable packaging film of claim 1 wherein said packaging film has a bottom surface, and wherein when pressure is exerted on said bottom surface in thickness direction, said initially close lower seam portion become split and said split upper seam portion expands to facilitate pressure regulation.

3. The reusable air-permeable packaging film of claim 2 wherein said split upper seam portion and said lower seam portion form a craze that tapers off from said top surface to said bottom surface of said packaging film when pressure is exerted on said bottom surface in thickness direction.

4. The reusable air-permeable packaging film of claim 1 wherein said material film is jointed to a reclosable zipper, and wherein said pre-selected area is adjacent to said reclosable zipper.

5. The reusable air-permeable packaging film of claim 1 wherein said resilient and nontoxic material is selected from the group consisting of acrylic resins, polyester, polyethylene (PE), polypropylene (PP), copolymer of PE and PP, ethylene-styrene copolymer (ES), cyclo olefin, polyethylene terephthalate (PET), Nylon, ethylenevinyl alcohol (EVOH), polyvinyl alcohol (PVA), ethylene-vinyl acetate (EVA), ethylene/methacrylic acid (E/MAA) ionomer, polyethylene naphthalate (PEN), poly ether ether ketone (PEEK), polycarbonate (PC), polysulfone, polyimide (PI), polyacrylonitrile (PAN), styrene acrylonitrile (SAN), polyurethane (PU), and any combinations thereof.

6. A reusable air-permeable packaging film comprising:
a layer of resilient and non-toxic material having a thickness between a top surface and a bottom surface; and
a plurality of micro-gaps distributed within at least a pre-selected area of the packaging film, wherein each of the micro-gaps transverses the thickness of the layer of material from the bottom surface to the top surface,
wherein in a static state with no pressure exerted on the layer of material, each of the micro-gaps is in a normally closed condition to prevent air permeation through the layer of material, each of the micro-gaps comprising a split upper seam portion with edge ridges demonstrated on the top surface of the layer of material and a lower seam portion on the bottom surface of the layer of material and in communication with the split upper seam.

7. The reusable air-permeable packaging film of claim 6 wherein the split upper seam portion and the lower seam portion form a craze that tapers off from the top surface to the bottom surface when pressure is exerted on the bottom surface in the thickness direction.

* * * * *